United States Patent
Connor et al.

(10) Patent No.: US 6,859,921 B2
(45) Date of Patent: Feb. 22, 2005

(54) SYSTEM, METHOD, AND COMPUTER PROGRAM PRODUCT FOR CREATING A HIERARCHY OF SOFTWARE COMPONENTS BASED ON THE PROGRAMMING CONSTRUCTS THEREIN

(75) Inventors: Michael David Connor, Commerce Township, MI (US); Laurence Edward England, Morgan Hill, CA (US); Leshek Fiedorowicz, Morgan Hill, CA (US); James Paul Hildner, Glen Ellyn, IL (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 09/871,470

(22) Filed: May 31, 2001

(65) Prior Publication Data

US 2002/0194577 A1 Dec. 19, 2002

(51) Int. Cl.$^7$ ................................................. G06F 9/44
(52) U.S. Cl. ..................................................... 717/120
(58) Field of Search .............................. 717/120, 103, 717/151–161; 715/505; 709/238–241; 710/5, 34

(56) References Cited

U.S. PATENT DOCUMENTS

| | | | | |
|---|---|---|---|---|
| 5,870,629 A | * | 2/1999 | Borden et al. ................ | 710/44 |
| 5,950,213 A | * | 9/1999 | Iida et al. .................... | 715/505 |
| 6,018,627 A | * | 1/2000 | Iyengar et al. .............. | 717/103 |
| 6,167,564 A | | 12/2000 | Fontana et al. ................ | 717/1 |

FOREIGN PATENT DOCUMENTS

| | | | | | |
|---|---|---|---|---|---|
| JP | 95162203 A | * | 6/1995 | ............. | G06F/9/06 |

* cited by examiner

Primary Examiner—Antony Nguyen-BA
Assistant Examiner—Kuo-Liang Tang
(74) Attorney, Agent, or Firm—John L. Rogitz

(57) ABSTRACT

A hierarchy of software components is created based on the programming constructs therein using a computer linked to a database having a collection of legacy software therein. Key component characteristics, e.g., programming constructs are defined. These constructs are assigned weights based on the difficulty or ease with which they can be reused in a new software component for use with a Web system or other network system. The legacy collection is searched to determine which, if any, of the key constructs are included therein. An ordered list is output that includes a list of the components containing the key constructs. The order of the list is based on the weight of the constructs in each component and the frequency with which they occur in each component. The list is then used to determine the effort and thus, the expense required to move entire components or blocks of code in the components into a Web system or other network system.

35 Claims, 1 Drawing Sheet

Architecture

Preprocessing

Preprocessing

Order List

SYSTEM, METHOD, AND COMPUTER PROGRAM PRODUCT FOR CREATING A HIERARCHY OF SOFTWARE COMPONENTS BASED ON THE PROGRAMMING CONSTRUCTS THEREIN

TECHNICAL FIELD

The present invention relates generally to computer software, and more specifically to restructuring software.

BACKGROUND OF THE INVENTION

With the emergence of the World Wide Web (the "Web") as an extremely powerful business tool, it has become almost a necessity for companies to foray into the Web or suffer the economic consequences of falling behind their competitors who do so. Unfortunately, for established companies this can be a very difficult and expensive task. For example, a large quantity of business software consists of programs written with third generation language (3GL) sources, e.g., Programming Language One (PL/I) and Common Business Oriented Language (COBOL). Much of this business software represents very large investments for the companies, and cannot be easily replaced. Moreover, much of this software includes business rules that have taken years to develop. It happens that many programs written with the 3GL application structure may not be directly compatible with the languages and protocols of the Web. Thus, the companies must purchase new and expensive software to facilitate their entrance into the Web market place or reconfigure their existing software—if possible or economically feasible.

For older companies, modernizing these systems to facilitate commerce via the Web can be very difficult and expensive, but it may be easier and less expensive than purchasing new software systems. One of the most difficult tasks when modernizing or restructuring existing software systems is determining the expense of restructuring existing software versus purchasing new software. Specifically, the difficulty exists in identifying which 3GL components utilize "difficult" programming constructs, i.e., constructs which are relatively difficult to restructure and reuse, and which 3GL components utilize "easy" programming constructs, i.e., constructs which are relatively easy to restructure and reuse.

Accordingly, there is a need for a system and method which will facilitate the modernization of existing system components employing 3GL sources.

SUMMARY OF THE INVENTION

A computer-implemented method for facilitating restructuring of software components includes identifying predetermined characteristics in the software components in the legacy collection. Based on identified predetermined characteristics, the software components are listed in a ranked order representative of the ease or difficulty of restructuring the components.

In a preferred embodiment, the software components comprise a legacy collection to be restructured for use in a wide area computer network such as the World Wide Web, and the predetermined characteristics include programming constructs. Preferably, the programming constructs are assigned respective weights representative of a relative ease or difficulty of restructuring, and the list is ordered based on the weights of identified programming constructs. In the preferred embodiment, the programming constructs are selected from the group including: Terminal I/O constructs, External Flow Transfer constructs, Data I/O constructs, and Computational constructs. The Terminal I/O constructs are assigned the highest weight, the Computational constructs are assigned to the lowest weight, and the External Flow Transfer constructs and Data I/O constructs are assigned weights therebetween. The weights of the constructs, however, can be altered based on the actual use of the constructs.

Preferably, the Terminal I/O constructs are selected from the group including: EXEC CICS GDS RECEIVE, ACCEPT, DISPLAY, EXEC CICS HANDLE AID, EXEC CICS RECEIVE, EXEC CICS RECEIVE MAP, EXEC CICS RECEIVE MAP MAPPING DEV, EXEC CICS SEND MAP, EXEC CICS SEND MAP MAPPING DEV, EXEC CICS ACQUIRE TERMINAL, EXEC CICS CREATE TERMINAL, EXEC CICS DISCARD TERMINAL, EXEC CICS INQUIRE TERMINAL, and EXEC CICS SET TERMINAL. The External Control Flow Transfer constructs are selected from the group including: SORT, STOP, EXEC CICS ABEND, EXEC CICS DUMP, EXEC CICS CHANGE TASK, EXEC CICS CONNECT, EXEC CICS SUSPEND, PERFORM, EXEC CICS ISSUE ABEND, EXEC CICS ISSUE ABORT, EXEC CICS SET UOW, EXEC CICS EXTRACT TCPIP, and CALL. Also, the Data I/O constructs are selected from the group including: EXEC CICS DELETEQ TD, OPEN, READ, EXEC CICS DELETEQ TS, EXEC CICS READQ TD, EXEC CICS READQ TS, EXEC CICS WRITEQ TD, and EXEC CICS WRITEQ TS.

In the preferred embodiment, the predetermined characteristics are selected from the group including: constructs that include transactions with an associated terminal identification, constructs that include any screen input or output, routines that reference variables that are not defined within the scope of a related compilation unit, constructs that use a common work area (CWA), compile units that are the target of CALL commands, transfer of control statements, communication area (COMMAREA) Linkage CICS, compile units that do not reference variables outside the scope of a related compilation unit, and compile units that contain calls to message queuing (MQ) services. Moreover, the predetermined characteristics include inbound calls or invocations and leaf routine.

In another aspect of the preferred embodiment of the present invention, a computer system includes a legacy collection of software components and a wide area computer network site. Moreover, this aspect includes an ordered list of the software components. The list indicates the relative ease of restructuring the components for use on the wide area computer network site.

In yet another aspect of the preferred embodiment of the present invention, a computer program device includes a computer readable medium having a program of instructions thereon for causing a computer to generate an ordered list of software components in a set of components. The program of instructions include logic means for identifying predetermined characteristics in the components and logic means for generating the ordered list based on the means for identifying.

The preferred embodiment of the present invention will now be described, by way of example, with reference to the accompanying drawings, in which:

DESCRIPTION OF AN EMBODIMENT OF THE INVENTION

Figure 1:
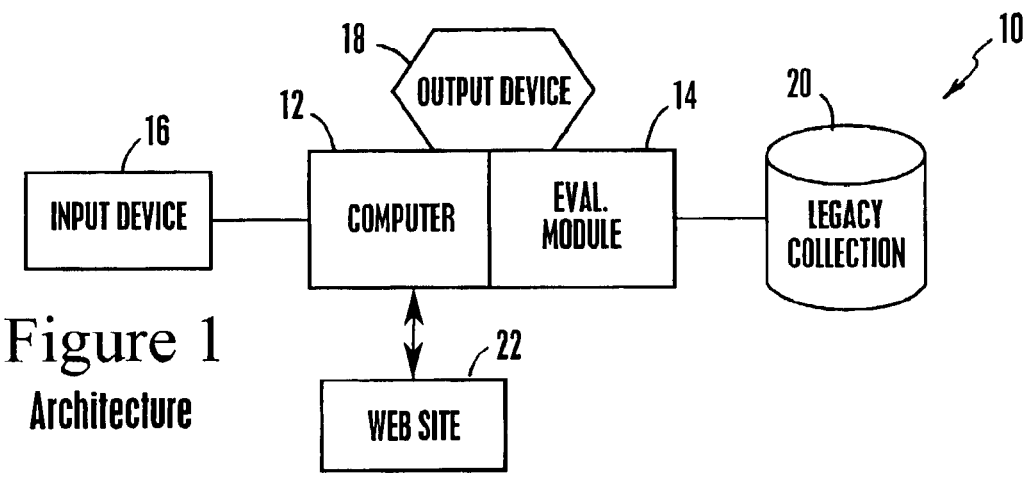
FIG. 1 is a block diagram of a system architecture.

Referring initially to FIG. 1, a system is shown and generally designated 10. FIG. 1 shows that the system 10 includes a computer 12 having an evaluation module 14 installed therein. As shown in FIG. 1, an input device 16, e.g., a keyboard, or a scanner, is connected to the computer 12. Moreover, an output device 18, e.g., a monitor, or a printer, is also connected to the computer 12. FIG. 1 shows that the computer 12 is connected to a database 20 in which a collection of legacy software is stored. The legacy software in the database 20 includes, e.g., pre-existing software components utilizing 3GL language sources. FIG. 1 further shows that the computer 10 is connected to a web site 22.

While the preferred implementation of the evaluation module 14 is a microprocessor within a personal computer, the evaluation module 14 may be any computer, including a Unix computer, or OS/2 server, or Windows NT server, or a laptop computer, or a hand held computer. Unix is a registered trademark of The Open Group in the United States and other countries. OS/2 is a registered trademark of International Business Machines Corporation in the United States, other countries, or both. Windows NT is a trademark of Microsoft Corporation in the United States, other countries, or both. Moreover, the evaluation module 14 includes a series of computer-executable instructions, as described below, which will allow the evaluation module 14 to create a hierarchy of 3GL components based on the programming constructs therein. These instructions may reside, for example, in random access memory (RAM) of the evaluation module 14.

Alternatively, the instructions may be contained on a data storage device with a computer readable medium, such as a computer diskette. Or, the instructions may be stored on a magnetic tape, hard disk drive, electronic read-only memory (ROM), optical storage device, or other appropriate data storage device or transmitting device thereby making a computer program product, i.e., an article of manufacture according to the invention. In an illustrative embodiment of the invention, the computer-executable instructions may be lines of C++ compatible code.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program elements in a form that instructs a digital processing apparatus (that is, a computer) to perform a sequence of function steps corresponding to those shown.

Figure 2:
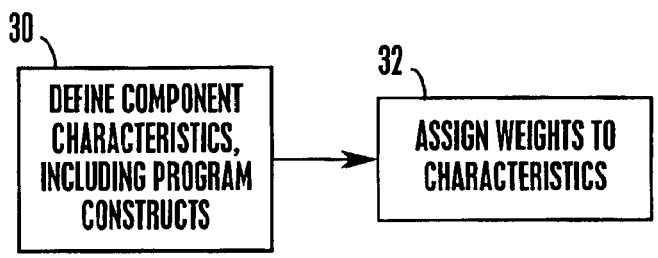
FIG. 2 is a flow chart of the preprocessing logic of the preferred embodiment of the present invention.

Referring to FIG. 2, the preprocessing logic is shown and commences at block 30 wherein the key component characteristics are defined. These key component characteristics can include 3GL programming constructs, e.g., PL/I, COBOL, and CICS programming constructs. It is to be understood, however, that the invention described herein is not limited to 3GL applications. It can be applied to other similar applications that may need to be restructured in order to properly function in a web-based environment. Tables 1 shows examples of key 3GL constructs. Moving to block 32 weights are assigned to the constructs based on the difficulty in which they can be reused by a system or protocol supported by the World Wide Web. Table 1 shows examples 3GL constructs and their corresponding predetermined "E-Business" weights, e.g., a range from zero to nine (0–9) with nine being the highest weight given to a construct. Higher weight constructs, in general, tend to increase the difficulty of reusing a component in which the construct is found without altering the component. On the other hand, as the weight of the construct decreases, the difficulty of generating a new component from an old component decreases.

It is to be understood that Table 1, below, includes three general categories of constructs: constructs that involve input from or output to a terminal or other interface (Terminal I/O), constructs that involve external control flow transfer, and constructs that involve the input or output of data (Data I/O). In general, the Terminal I/O constructs typically require the most effort for reuse with a new component. On the other hand, the Data I/O constructs typically require the least effort for reuse with a new component. Moreover, the effort required for reusing the External Control Flow Transfer constructs falls typically somewhere between that required for the Terminal I/O constructs and the Data I/O constructs. A fourth category of constructs, not shown in the table, includes Computational constructs that involve the manipulation of data.

It is also to be understood that the weights assigned to the constructs can be used to determine the expense and effort of updating the legacy collection so that it can be used in conjunction with a Web-based system. Specifically, the more weight given to a construct typically indicates that potentially more action is required to develop a useable new component from the source component. However, it is to be understood that in certain situations a seemingly high weight construct may not increase the difficulty of reusing a particular component. For example, a series of display statements (Terminal I/O constructs) that are only used during a program de-bugging process will typically not be important to the transfer of the 3GL component to the Web-based system. Thus, the weights of these statements can be disregarded when determining the overall difficulty of reusing the component in which they are found. It is further to be understood that the weights assigned to the constructs can be tailored for a particular legacy collection at a particular site based on the general usage of the constructs at that site.

TABLE 1

Exemplary Legacy Constructs and Corresponding E-Business Weights

| Language | Construct | Function | Category | Weight |
|---|---|---|---|---|
| COBOL | OPEN | opens designated files | Data I/O | 2 |
| COBOL | READ | reads a record from a specified file | Data I/O | 2 |
| CICS (COBOL/PLI) | EXEC CICS SYNCPOINT | divides a task into smaller logical units of work by establishing syncpoints | | 2 |
| CICS (COBOL/PLI) | EXEC CICS CHANGE TASK | alters program | External control flow transfer | 3 |
| COBOL | CALL | executes a subprogram | External control flow transfer | 5 |
| COBOL | PERFORM | executes the sentences of a designated paragraph | External control flow transfer | 5 |
| PLI | CALL | executes a subprogram | External control flow transfer | 5 |
| CICS (COBOL/PLI) | EXEC CICS ISSUE ABEND | provides a means for abnormally ending a conversation between two or more application programs | External control flow transfer | 5 |
| CICS (COBOL/PLI) | EXEC CICS ISSUE ABORT | provides a means for restoring to a previous state all or part of a system | External control flow transfer | 5 |
| CICS (COBOL/PLI) | EXEC CICS SET UOW | sets a unit of work | External control flow transfer | 5 |
| CICS (COBOL/PLI) | EXEC CICS WEB | retrieves the various parts of an incoming hypertext transfer protocol (HTTP) and builds an HTTP response | | 5 |
| CICS (COBOL/PLI) | EXEC CICS PERFORM DUMP | requests a virtual storage extended screen dump (VSE DUMP) of a CICS portion | External control flow transfer | 5 |
| CICS (COBOL/PLI) | EXEC CICS GDS RECEIVE | reads general data stream data | Terminal I/O | 9 |
| COBOL | SORT | resequences file or files | External control flow transfer, Data I/O | 9 |
| PLI | STOP | terminates execution of program | External control flow transfer | 9 |
| CICS (COBOL/PLI) | EXEC CICS ABEND | provides procedures and logic if the program terminates abnormally | External control flow transfer | 9 |
| CICS (COBOL/PLI) | EXEC CICS DELETEQ TD | deletes an intrapartition transient data queue | Data I/O | 9 |
| CICS (COBOL/PLI) | EXEC CICS DELETEQ TS | deletes a temporary storage queue | Data I/O | 9 |
| CICS (COBOL/PLI) | EXEC CICS READQ TD | retrieve data from a transient data queue | Data I/O | 9 |
| CICS (COBOL/PLI) | EXEC CICS READQ TS | retrieves data from a temporary storage queue | Data I/O | 9 |
| CICS (COBOL/PLI) | EXEC CICS WRITEQ TD | adds data to a transient data queque | Data I/O | 9 |
| CICS (COBOL/PLI) | EXEC CICS WRITEQ TS | adds data to a temporary storage queue | Data I/O | 9 |
| CICS (COBOL/PLI) | EXEC CICS SEND MAP | writes data to a terminal from an application program | Terminal I/O | 9 |
| CICS (COBOL/PLI) | EXEC CICS SEND MAP MAPPING DEV | writes data to a terminal from an application program | Terminal I/O | 9 |
| CICS (COBOL/PLI) | EXEC CICS RECEIVE MAP | reads data from the terminal into an application program | Terminal I/O | 9 |
| CICS (COBOL/PLI) | EXEC CICS RECEIVE MAP MAPPING DEV | reads data from the terminal into an application program | Terminal I/O | 9 |
| CICS (COBOL/PLI) | EXEC CICS RECEIVE | reads data from the terminal into an application program | Terminal I/O | 9 |
| CICS (COBOL/PLI) | EXEC CICS ACQUIRE TERMINAL | acquires a session with a terminal | Terminal I/O | 9 |
| CICS (COBOL/PLI) | EXEC CICS CREATE TERMINAL | creates a logical terminal to simulate an actual terminal | Terminal I/O | 9 |
| CICS (COBOL/PLI) | EXEC CICS DISCARD TERMINAL | removes logical terminal | Terminal I/O | 9 |
| CICS (COBOL/PLI) | EXEC CICS SEND | writes data to a terminal | Terminal I/O | 9 |
| CICS (COBOL/PLI) | EXEC CICS SET TERMINAL | changes attributes of a terminal | Terminal I/O | 9 |
| COBOL | ACCEPT | allows communication from user at terminal | Terminal I/O | 9 |
| COBOL | DISPLAY | allows communication from terminal to user | Terminal I/O | 9 |
| PLI | DISPLAY | allows communication with system operator | Terminal I/O | 9 |
| CICS (COBOL/PLI) | EXEC CICS HANDLE AID | indicates which key on the terminal is used to initiate transmission | Terminal I/O, External control flow transfer | 9 |

TABLE 1-continued

Exemplary Legacy Constructs and Corresponding E-Business Weights

| Language | Construct | Function | Category | Weight |
|---|---|---|---|---|
| CICS (COBOL/PLI) | EXEC CICS INQUIRE TERMINAL | retrieves information about a terminal | Terminal I/O | 9 |
| CICS (COBOL/PLI) | EXEC CICS EXTRACT TCPIP | allows retrieval of transmission control protocol (TCP) and internet protocol (IP) information, e.g., client name and server address | External control flow transfer | 9 |
| CICS (COBOL/PLI) | EXEC CICS CONNECT | allows conversation characteristics to be specified and attaches required back-end transactions | External control flow transfer | 9 |
| CICS (COBOL/PLI) | EXEC CICS SUSPEND | relinquishes control to tasks of higher or equal dispatching priority | External control flow transfer | 9 |

As shown above, the higher weight constructs encompass those that include transactions with an associated terminal identification and those that include any screen input or output. Moreover, constructs that use a common work area (CWA) increase the difficulty as do routines that use variables that are not defined within the scope of the compilation unit. The lower weight constructs include compile units that are the target of CALL statements and transfer of control statements that contain well-defined interfaces. Moreover, the lower weight constructs include communication area (COMMAREA) linkage CICS transactions—if they do not contain any of the above offending language constructs. The lower weight constructs also encompass compile units that do not reference variables outside the scope of the compilation unit and compile units that contain calls to message queuing (MQ) services. Characteristics that are more likely to be "easy" than "difficult" include a large number of in-bound calls or invocations and leaf routines which do not contain any outbound calls. It is to be understood that the above tables are not intend to be comprehensive lists of "difficult" and "easy" 3GL constructs. Rather, they are lists of exemplary constructs which increase or decrease the difficulty of reusing 3GL components in conjunction with Web systems.

Figure 3:
FIG. 3 is a flow chart of the processing logic of the preferred embodiment of the present invention.
Figure 4:
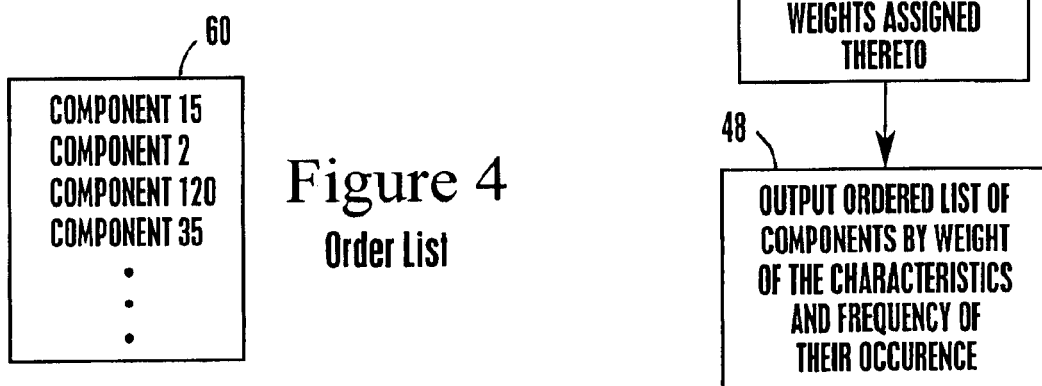
FIG. 4 is table of ordered components.

Referring now to FIG. 3, the processing logic of the present invention is shown. Commencing at block 40, the copybooks, embedded files, and/or the macros, are expanded to ensure a complete search of the legacy collection. At block 42, the legacy collection stored in the database 20 is searched using the key programming constructs defined above during the preprocessing phase. Proceeding to block 44, the 3GL components in which the key constructs are found are identified. Then, the key constructs are merged with the predetermined weights, e.g., the "E-Business" weights described above, assigned thereto. At block 48, a list of the 3GL components which contain the key constructs is output via the output device 18. The list of the 3GL components is ordered based on the weight of the constructs found in each component and the frequency with which the constructs occur in each 3GL component. FIG. 4 shows an example of an ordered list 60. The list 60 can be used to evaluate and estimate the expense of reformatting or restructuring the legacy collection in the database 20 so that it can be used in conjunction with a Web-based system. Thus, the owner or operator of the legacy collection can decide whether to modernize the legacy collection to make it Web compatible or purchase new software in lieu thereof.

With the configuration of structure described above, it is to be appreciated that system and method described above provides a means for evaluating a collection of legacy software to relatively quickly and easily determine which software functions can be relatively quickly moved to a Web-base system. Moreover, this method provides a means for allowing someone to estimate the amount of effort required to move a block of code into a new component by knowing the number of offending language constructs discovered therein. Also, this system and method provides a means for visually demonstrating the relative ease of using one block of code versus another in a new component based on the language constructs discovered in the old components. It is to be understood that the invention described above is not limited to restructuring 3GL applications. It can be used to restructure other similar applications. Also, the invention described above is not limited to restructuring computer applications for use in web systems or other network systems.

While the particular SYSTEM, METHOD, AND COMPUTER PROGRAM PRODUCT FOR CREATING A HIERARCHY OF SOFTWARE COMPONENTS BASED ON THE PROGRAMMING CONSTRUCTS THEREIN as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A computer-implemented method for facilitating restructuring of at least some software components in a collection of software components, comprising:
   identifying at least some predetermined characteristics in at least some of the software components in the collection;
   based on the identified predetermined characteristics, listing at least some of the software components in a ranked order representative of the ease or difficulty of restructuring the components for use in at least one Internet application, the determined characteristics including programming constructs.

2. The method of claim 1, wherein at least some of the programming constructs are assigned respective weights representative of a relative ease or difficulty of restructuring, the list being ordered based at least partially on the weights of identified programming constructs.

3. The method of claim 2, wherein at least one programming constructs is selected from the group consisting of: Terminal I/O constructs, External Flow Transfer constructs, Data I/O constructs, and Computational constructs.

4. The method of claim 3, wherein the Terminal I/O constructs are assigned a highest weight, the Computational constructs are assigned a lowest weight, and the External Flow Transfer constructs and Data I/O constructs are assigned weights therebetween.

5. The method of claim 3, further comprising the act of:
   altering the weights of the constructs based on the actual use of the constructs.

6. The method of claim 3, wherein the Terminal I/O constructs are selected from the group including: EXEC CICS GDS RECEIVE, ACCEPT, DISPLAY, EXEC CICS HANDLE AID, EXEC CICS RECEIVE, EXEC CICS RECEIVE MAP, EXEC CICS RECEIVE MAP MAPPING DEV, EXEC CICS SEND MAP, EXEC CICS SEND MAP MAPPING DEV, EXEC CICS ACQUIRE TERMINAL, EXEC CICS CREATE TERMINAL, EXEC CICS DISCARD TERMINAL, EXEC CICS INQUIRE TERMINAL, and EXEC CICS SET TERMINAL.

7. The method of claim 3, wherein the External Control Flow Transfer constructs are selected from the group including: SORT, STOP, EXEC CICS ABEND, EXEC CICS DUMP, EXEC CICS CHANGE TASK, EXEC CICS CONNECT, EXEC CICS SUSPEND, PERFORM, EXEC CICS ISSUE ABEND, EXEC CICS ISSUE ABORT, EXEC CICS SET UOW, EXEC CICS EXTRACT TCPIP, and CALL.

8. The method of claim 3, wherein the Data I/O constructs are selected from the group including: EXEC CICS DELETEQ TD, OPEN, READ, EXEC CICS DELETEQ TS, EXEC CICS READQ TD, EXEC CICS READQ TS, EXEC CICS WRITEQ TD, EXEC CICS WRITEQ TS, READ, WRITE, PUT, and GET.

9. The method of claim 1, wherein the predetermined characteristics are selected from the group including: constructs that include transactions with an associated terminal identification, constructs that include any screen input or output, routines that use variables that are not defined within the scope of a related compilation unit, and constructs that use a common work area (CWA), compile units that are the target of CALL commands, exit controls (XCTL), communication area (COMMAREA) Linkage CICS, compile units that do not reference variables outside the scope of a related compilation unit, and compile units that contain calls to message queuing (MQ) services.

10. The method of claim 1, wherein the predetermined characteristics include at least one inbound call or invocation.

11. The method of claim 1, wherein the predetermined characteristics include at least one leaf routine.

12. A computer system, comprising:
    a legacy collection of software components;
    a wide area computer network site; and
    an ordered list of at least some of the software components, the list indicating the relative ease of restructuring the components for use on the wide area computer network site.

13. The system of claim 12, wherein the list is generated by a method comprising the acts of:
    identifying at least some predetermined characteristics in at least some of the software components in the legacy collection;
    based on identified predetermined characteristics, listing at least some of the software components in a ranked order representative of the ease or difficulty of restructuring the components for use in the wide area computer network.

14. The system of claim 13, wherein the predetermined characteristics include programming constructs.

15. The system of claim 14, wherein at least some of the programming constructs are assigned respective weights representative of a relative ease or difficulty of restructuring, the list being ordered based at least partially on the weights of identified programming constructs.

16. The system of claim 15, wherein at least one programming constructs is selected from the group including: Terminal I/O constructs, External Flow Transfer constructs, Data I/O constructs, and Computational constructs.

17. The system of claim 16, wherein the Terminal I/O constructs are assigned the highest weight, the Computational constructs are assigned to the lowest weight, and the External Flow Transfer constructs and Data I/O constructs are assigned weights therebetween.

18. The system of claim 17, further comprising the act of:
    altering the weights of the constructs based on the actual use of the constructs.

19. The system of claim 17, wherein the Terminal I/O constructs are selected from the group including: EXEC CICS GDS RECEIVE, ACCEPT, DISPLAY, EXEC CICS HANDLE AID, EXEC CICS RECEIVE, EXEC CICS RECEIVE MAP, EXEC CICS RECEIVE MAP MAPPING DEV, EXEC CICS SEND MAP, EXEC CICS SEND MAP MAPPING DEV, EXEC CICS ACQUIRE TERMINAL, EXEC CICS CREATE TERMINAL, EXEC CICS DISCARD TERMINAL, EXEC CICS INQUIRE TERMINAL, and EXEC CICS SET TERMINAL.

20. The system of claim 17, wherein the External Control Flow Transfer constructs are selected from the group including: SORT, STOP, EXEC CICS ABEND, EXEC CICS DUMP, EXEC CICS CHANGE TASK, EXEC CICS CONNECT, EXEC CICS SUSPEND, PERFORM, EXEC CICS ISSUE ABEND, EXEC CICS ISSUE ABORT, EXEC CICS SET UOW, EXEC CICS EXTRACT TCPIP, and CALL.

21. The system of claim 17, wherein the Data I/O constructs are selected from the group including: EXEC CICS DELETEQ TD, OPEN, READ, EXEC CICS DELETEQ TS, EXEC CICS READQ TD, EXEC CICS READQ TS, EXEC CICS WRITEQ TD, and EXEC CICS WRITEQ TS, READ, WRITE, PUT, and GET.

22. The system of claim 15, wherein the wide area computer network is the World Wide Web.

23. The system of claim 13, wherein the predetermined characteristics are selected from the group including: constructs that include transactions with an associated terminal identification, constructs that include any screen input or output, routines that use variables that are not defined within the scope of a related compilation unit, and constructs that use a common work area (CWA), compile units that are the target of CALL commands, exit controls (XCTL), communication area (COMMAREA) Linkage CICS, compile units that do not reference variables outside the scope of a related compilation unit, and compile units that contain calls to message queuing (MQ) services.

24. The system of claim 13, wherein the predetermined characteristics include at least one inbound call or invocation.

25. The system of claim 13, wherein the predetermined characteristics include at least one leaf routine.

26. A computer program device, comprising:
  a computer readable medium having a program of instructions thereon for causing a computer to generate an ordered list of at least some software components in a set of components, comprising:
  logic means for identifying at least one predetermined characteristic in at least some of the components, the characteristic being at least one programming construct selected from the group of constructs Terminal I/O constructs, External Flow Transfer constructs, Data I/O constructs, and Computational constructs; and
  logic means for generating the ordered list based at least in part on the means for identifying.

27. The computer program device of claim 26, wherein the programming construct is assigned a weight representative of a relative ease or difficulty of restructuring, the list being ordered based at least partially on the weight of identified programming constructs.

28. The computer program device of claim 26, wherein the Terminal I/O constructs are assigned the highest weight, the Computational constructs are assigned to the lowest weight, and the External Flow Transfer constructs and Data I/O constructs are assigned weights therebetween.

29. The computer program device of claim 28, further comprising the act of:
  altering the weights of the constructs based on the actual use of the constructs.

30. The computer program device of claim 28, wherein the Terminal I/O constructs are selected from the group including: EXEC CICS GDS RECEIVE, ACCEPT, DISPLAY, EXEC CICS HANDLE AID, EXEC CICS RECEIVE, EXEC CICS RECEIVE MAP, EXEC CICS RECEIVE MAP MAPPING DEV, EXEC CICS SEND MAP, EXEC CICS SEND MAP MAPPING DEV, EXEC CICS ACQUIRE TERMINAL, EXEC CICS CREATE TERMINAL, EXEC CICS DISCARD TERMINAL, EXEC CICS INQUIRE TERMINAL, and EXEC CICS SET TERMINAL.

31. The computer program device of claim 28, wherein the External Control Flow Transfer constructs are selected from the group including: SORT, STOP, EXEC CICS ABEND, EXEC CICS DUMP, EXEC CICS CHANGE TASK, EXEC CICS CONNECT, EXEC CICS SUSPEND, PERFORM, EXEC CICS ISSUE ABEND, EXEC CICS ISSUE ABORT, EXEC CICS SET UOW, EXEC CICS EXTRACT TCPIP, and CALL.

32. The computer program device of claim 28, wherein the Data I/O constructs are selected from the group including: EXEC CICS DELETEQ TD, OPEN, READ, EXEC CICS DELETEQ TS, EXEC CICS READQ TD, EXEC CICS READQ TS, EXEC CICS WRITEQ TD, and EXEC CICS WRITEQ TS, READ, WRITE, PUT, and GET.

33. The computer program device of claim 26, wherein the predetermined characteristic is selected from the group including: constructs that include transactions with an associated terminal identification, constructs that include any screen input or output, routines that use variables that are not defined within the scope of a related compilation unit, and constructs that use a common work area (CWA), compile units that are the target of CALL commands, exit controls (XCTL), communication area (COMMAREA) Linkage CICS, compile units that do not reference variables outside the scope of a related compilation unit, and compile units that contain calls to modified quantization (MQ) services.

34. The computer program device of claim 26, wherein the predetermined characteristic includes at least one inbound call or invocation.

35. The computer program device of claim 26, wherein the predetermined characteristic includes at least one leaf routine.

* * * * *